US012754281B2

(12) United States Patent
Kwon et al.

(10) Patent No.: US 12,754,281 B2
(45) Date of Patent: Oct. 6, 2026

(54) FENDER COVER FOR MOUNTING OF AUTONOMOUS DRIVING SENSOR

(71) Applicants: Hyundai Motor Company, Seoul (KR); Kia Corporation, Seoul (KR)

(72) Inventors: Woo Jae Kwon, Suwon-si (KR); Hoon Chang, Seoul (KR); Jong Wan Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 380 days.

(21) Appl. No.: 18/535,133

(22) Filed: Dec. 11, 2023

(65) Prior Publication Data

US 2025/0102617 A1 Mar. 27, 2025

(30) Foreign Application Priority Data

Sep. 27, 2023 (KR) ........................ 10-2023-0129974

(51) Int. Cl.

| | |
|---|---|
| ***G01S 7/02*** | (2006.01) |
| ***B60R 13/04*** | (2006.01) |
| ***B60W 60/00*** | (2020.01) |
| ***G01S 7/481*** | (2006.01) |
| ***G01S 13/931*** | (2020.01) |
| ***G01S 17/931*** | (2020.01) |

(52) U.S. Cl.

CPC .............. *G01S 7/027* (2021.05); *B60R 13/04* (2013.01); *B60W 60/00* (2020.02); *G01S 7/481* (2013.01); *G01S 13/931* (2013.01); *G01S 17/931* (2020.01); *B60W 2420/408* (2024.01)

(58) Field of Classification Search

CPC ........ G01S 7/027; G01S 17/931; G01S 7/481; G01S 13/931; B60R 13/04; B60W 60/00; B60W 2420/408

See application file for complete search history.

(56) References Cited

U.S. PATENT DOCUMENTS

| | | | | |
|---|---|---|---|---|
| 11,292,396 B2 * | 4/2022 | Hwang | .................... | G01S 7/027 |
| D954,620 S * | 6/2022 | Ahn | .............................. | D12/173 |
| 12,405,350 B2 * | 9/2025 | Brem | .................... | G01S 13/931 |
| 12,523,766 B2 * | 1/2026 | Mori | ........................ | G01S 7/027 |
| 2015/0274091 A1 * | 10/2015 | Lang | ...................... | G01D 11/30 348/148 |

(Continued)

FOREIGN PATENT DOCUMENTS

| | | | |
|---|---|---|---|
| JP | 2023037852 | A | 3/2023 |
| KR | 20200121544 | A | 10/2020 |
| KR | 20210085734 | A | 7/2021 |

*Primary Examiner* — Taras P Bemko

(74) *Attorney, Agent, or Firm* — Slater Matsil, LLP

(57) ABSTRACT

A fender cover for mounting an autonomous driving sensor includes a first cover part fastenable to a fender for a vehicle in which a mounting area is machined. The first cover part is configured to guide a first sensor to be mounted in a protruded state in the mounting area. A second cover part is coupled to the first cover part and is configured to guide a mounting position of the first sensor. A third cover part is coupled to the second cover part and fastened to the mounting area. The third cover part is disposed to support the second cover part and a second sensor mounted in the mounting area and includes a mounting guide hole with a shape corresponding to a shape of the second sensor.

20 Claims, 11 Drawing Sheets

(56) References Cited

U.S. PATENT DOCUMENTS

| | | | | |
|---|---|---|---|---|
| 2019/0256009 | A1* | 8/2019 | Miwa | G01S 13/931 |
| 2021/0016703 | A1* | 1/2021 | Shitara | B60Q 1/346 |
| 2021/0148737 | A1* | 5/2021 | Yamaji | G01S 7/4813 |
| 2021/0229754 | A1* | 7/2021 | Shibata | B60R 11/00 |
| 2023/0072056 | A1 | 3/2023 | Izuhara et al. | |
| 2023/0242037 | A1 | 8/2023 | Ning et al. | |
| 2023/0271590 | A1* | 8/2023 | Moltmann | G06Q 10/047 701/24 |
| 2023/0359254 | A1* | 11/2023 | Chen | G06F 1/20 |
| 2025/0102679 | A1* | 3/2025 | Braley | G01S 7/497 |

* cited by examiner

FENDER COVER FOR MOUNTING OF AUTONOMOUS DRIVING SENSOR

CROSS-REFERENCE TO RELATED APPLICATIONS

This application claims the benefit of Korean Patent Application No. 10-2023-0129974, filed on Sep. 27, 2023, which application is hereby incorporated herein by reference.

TECHNICAL FIELD

The present disclosure relates to a fender cover for mounting of an autonomous driving sensor.

BACKGROUND

In general, automatic driving is to automatically perform various operations required while a vehicle travels, and for example, an autonomous driving vehicle may travel on a road by itself without a driver's manipulation of a handle, an accelerator pedal, a brake, or the like.

For the autonomous driving, various sensors such as a camera, a radio detecting and ranging (radar), a light detection and ranging (LiDAR), and an ultrasonic sensor are installed to recognize a surrounding environment including a nearby terrain and position of a vehicle and automatically performs the maintenance of a travel lane line, the securement of a safe distance to an adjacent vehicle, the detection and collision evasion of nearby obstacles, and the like.

Since the sensors for autonomous driving, such as a camera, a radar, a LiDAR, and an ultrasonic sensor, are mainly intended to ensure that there are no blind spots of a vehicle, the sensors are usually positioned on the front, rear, and corners of the vehicle.

Therefore, as various sensors need to be mounted on the front and rear of the autonomous driving vehicle, it is necessary to mount the sensors on a structure applied to a body or newly mount a separate exterior part with a protruded shape for fixing the sensors on the body.

In particular, when the sensors for autonomous driving are mounted on a fender and a roof of the vehicle, protrusion from a side surface and an upper surface of the vehicle is excessive compared to the conventional shape, and thus it is necessary to apply a structure for mounting to the exterior of the body while optimizing the shape.

SUMMARY

The present disclosure relates to a fender cover for mounting of an autonomous driving sensor. Particular embodiments relate to a fender cover for mounting of an autonomous driving sensor, which can achieve the same sensor performance as before while improving a shape of an exterior of a body by separately mounting a plurality of covers in mounting a plurality of sensors for autonomous driving on a fender for a vehicle.

Embodiments of the present disclosure provide a fender cover for mounting of an autonomous driving sensor, which can achieve the same sensor performance as before while improving a shape of an exterior of a body by dividing a plurality of covers and mounting the sensor by the covers in mounting radio light detection and ranging (radar) and light detection and ranging (LiDAR) sensors for autonomous driving on a fender having no separate mounting space and an entirely protruded shape.

A fender cover for mounting of an autonomous driving sensor according to embodiments of the present disclosure includes a first cover part fastened to a fender for a vehicle in which a mounting area is machined and configured to guide a first sensor to be mounted in a protruded state in the mounting area, a second cover part coupled to the first cover part and configured to guide a mounting position of the first sensor to be fixed, and a third cover part coupled to the second cover part and fastened to the mounting area, disposed to support the second cover part and a second sensor mounted in the mounting area, and including a mounting guide hole with a shape corresponding to a shape of the second sensor.

Here, the mounting area in addition to a plurality of mounting holes may be formed to be pre-machined in the fender.

The first cover part may include a bracket for mounting of the first sensor and may be formed to have a rounded one side to surround an outer circumferential surface of the first sensor.

Preferably, the first sensor may be formed as a light detection and ranging (LiDAR) sensor.

In addition, the second cover part may include a seating groove with a shape corresponding to a shape of the first sensor and guide the mounting position of the first sensor to be fixed in a state in which the first sensor is exposed to the outside through the seating groove.

Here, the second cover part may include a latching hook at one side facing the first cover part and allow one side of the facing first cover part to be positioned by being caught on the latching hook as the second cover part is coupled to the first cover part.

In addition, the second cover part may be disposed so that one side in which the seating groove is formed faces one side of the first cover part and includes a latching hook therein so that the one side of the first cover part is positioned by being caught on the latching hook.

Meanwhile, the second cover part may include a clip member mounted therein to be inserted into a fastening hole formed in the first cover part.

Here, the clip member may be formed in a wedge shape and provided in a structure that is positioned by being caught due to an expanded width as the clip member is inserted into the fastening hole.

In addition, the second cover part may be provided on a mounting member formed to extend toward the second sensor and may include a mounting hole formed so that the third cover part is coupled by being disposed to overlap.

The third cover part may include coupling guide members formed to be inserted into a pair of mounting holes disposed to be spaced apart from each other in a vertical direction in the mounting member.

In addition, the third cover part may include a first cover member including the mounting guide hole and a second cover member extending integrally from the first cover member to support a lower portion of the second cover part and mounted in the mounting area.

Here, the second cover member may include a plurality of coupling protrusions inserted into mounting holes of the mounting area and allowing one side of the third cover part to be fixed, and the first cover member may include a hook member positioned by being caught on a mount for mounting of the second sensor and allowing the other side of the third cover part to be fixed.

Preferably, the second sensor may be formed as a radio detecting and ranging (radar) sensor coupled at different mounting angles in a vertical direction.

Meanwhile, the fender cover for mounting of the autonomous driving sensor according to embodiments of the present disclosure may further include a fourth cover part formed to shield an inside of the first cover part on which the first sensor is mounted from the outside as the first sensor is mounted to be inclined on the first cover part.

The fourth cover part may include hook members inserted into hook fastening holes formed along upper edges of the first cover part and the third cover part.

Preferably, the hook member may be provided as a plurality of hook members and inserted into each of a plurality of hook fastening holes disposed to be spaced a 90° interval from each other to restrict movements of the fourth cover part in a longitudinal direction and a width direction.

In addition, the fourth cover part may further include a clip member inserted into a detachment hole spaced apart from the hook fastening hole and formed along the upper edge of the first cover part.

According to embodiments of the present disclosure, it is possible to achieve the same sensor performance as before while improving the shape of the exterior of the body by dividing the plurality of covers and mounting the sensors by the covers in mounting the radar and LiDAR sensors for autonomous driving on the fender having no separate mounting space and the entirely protruded shape.

In addition, according to embodiments of the present disclosure, since the separate hole machining for mounting of the sensors is not required, it is possible to easily mount the sensors, and since the mounting is made by the assembly of the cover, even when the sizes of the sensors increase, the effective response and mounting are possible.

In addition, according to embodiments of the present disclosure, by performing the selective fastening or the surface matching with the nearby parts in order to improve the sense of heterogeneity with the nearby parts with respect to the divided covers, it is possible to improve assemblability and exterior quality.

It is understood that the term "automotive", vehicle, or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the embodiments of the present disclosure, and wherein.

It should be understood that the appended drawings are not necessarily to scale, presenting a somewhat simplified representation of various preferred features illustrative of the basic principles of embodiments of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of embodiments of the present disclosure throughout the several figures of the drawings.

DETAILED DESCRIPTION OF ILLUSTRATIVE EMBODIMENTS

Hereinafter, preferred embodiments according to the present disclosure will be described in detail with reference to the accompanying drawings.

Advantages and features of embodiments of the present disclosure and methods for achieving them will become clear with reference to embodiments described below in detail in conjunction with the accompanying drawings.

However, the embodiments of the present disclosure are not limited to the embodiments disclosed below but will be implemented in various different forms, these embodiments are merely provided to make the disclosure of the present disclosure complete and fully inform those skilled in the art to which the present disclosure pertains completely of the scope of the present disclosure, and the embodiments of the present disclosure are only defined by the scope of the appended claims.

In addition, in the description of embodiments of the present disclosure, when it is determined that related known technologies may obscure the gist of the embodiments of the present disclosure, a detailed description thereof will be omitted.

Figure 1:
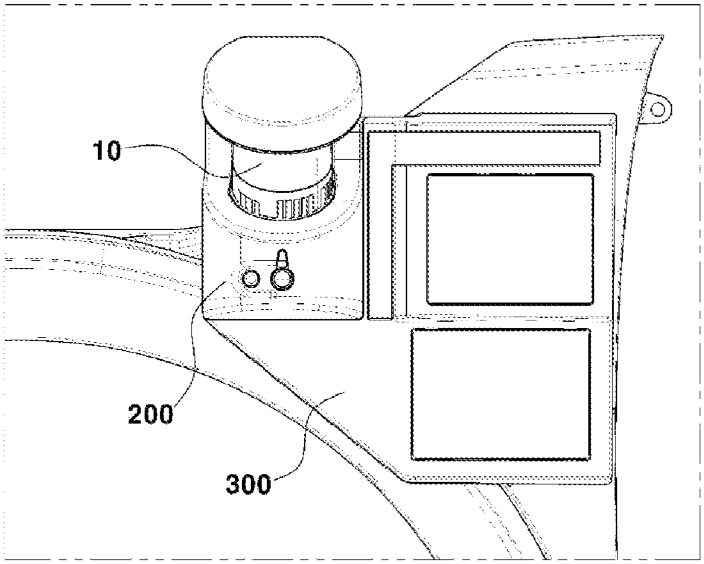
FIG. 1 is a view illustrating a fender cover for mounting of an autonomous driving sensor according to an embodiment of the present disclosure.
Figure 2:
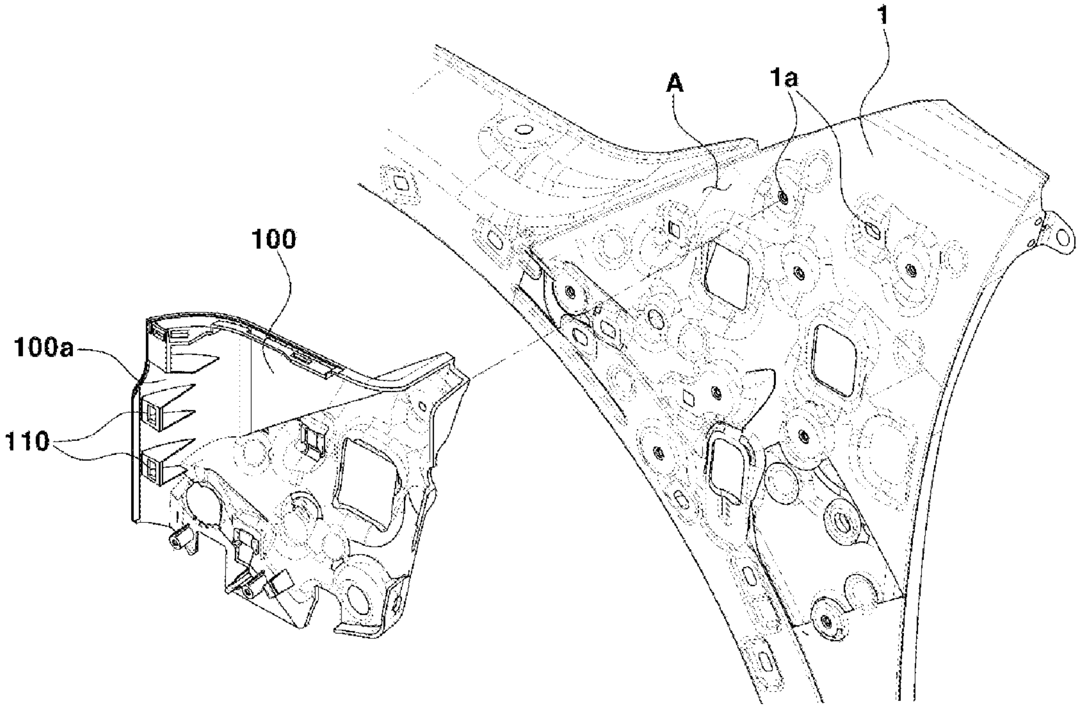
FIG. 2 is a view illustrating mounting of a first cover part of the fender cover for mounting of the autonomous driving sensor according to an embodiment of the present disclosure.
Figure 3:
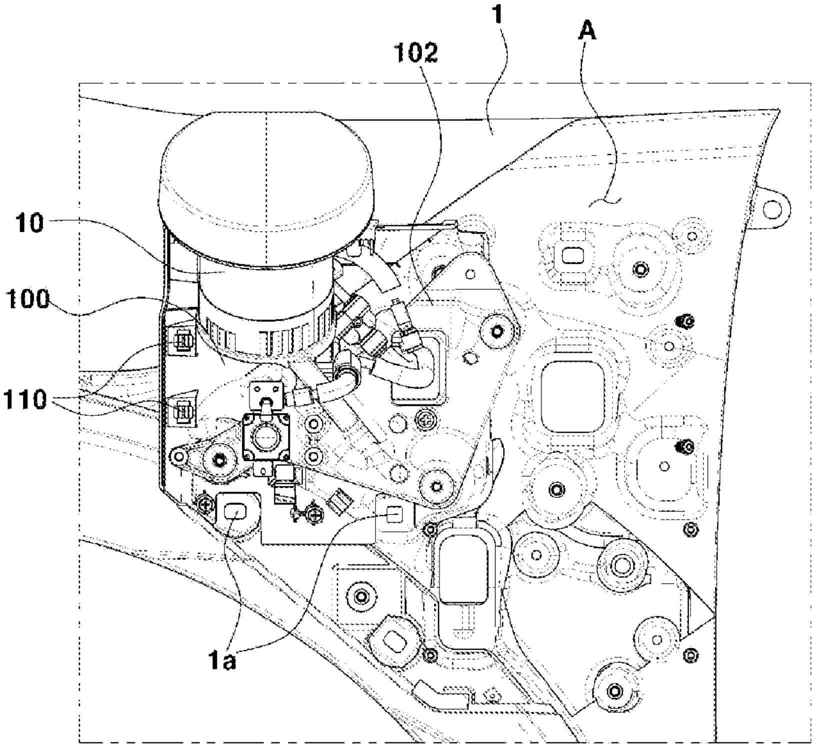
FIG. 3 is a view illustrating a mounted state of the first cover part of the fender cover for mounting of the autonomous driving sensor according to an embodiment of the present disclosure.

FIG. 1 is a view illustrating a fender cover for mounting of an autonomous driving sensor according to an embodiment of the present disclosure, FIG. 2 is a view illustrating mounting of a first cover part of the fender cover for mounting of the autonomous driving sensor according to an embodiment of the present disclosure, and FIG. 3 is a view illustrating a mounted state of the first cover part of the fender cover for mounting of the autonomous driving sensor according to an embodiment of the present disclosure.

Figure 4:
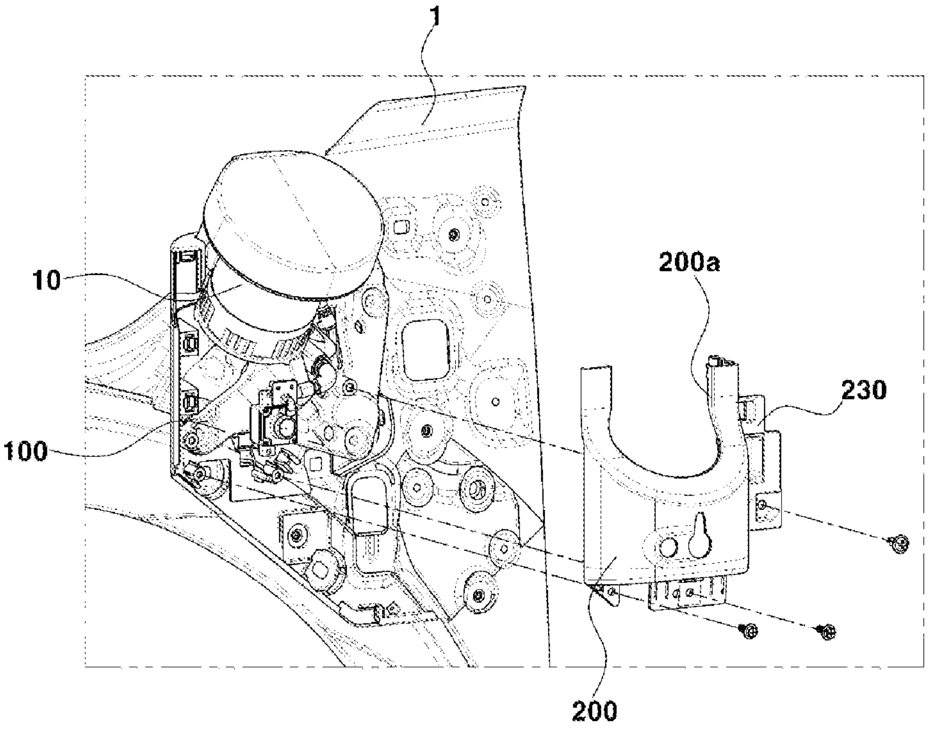
FIG. 4 is a view illustrating mounting of a second cover part of the fender cover for mounting of the autonomous driving sensor according to an embodiment of the present disclosure.
Figure 5:
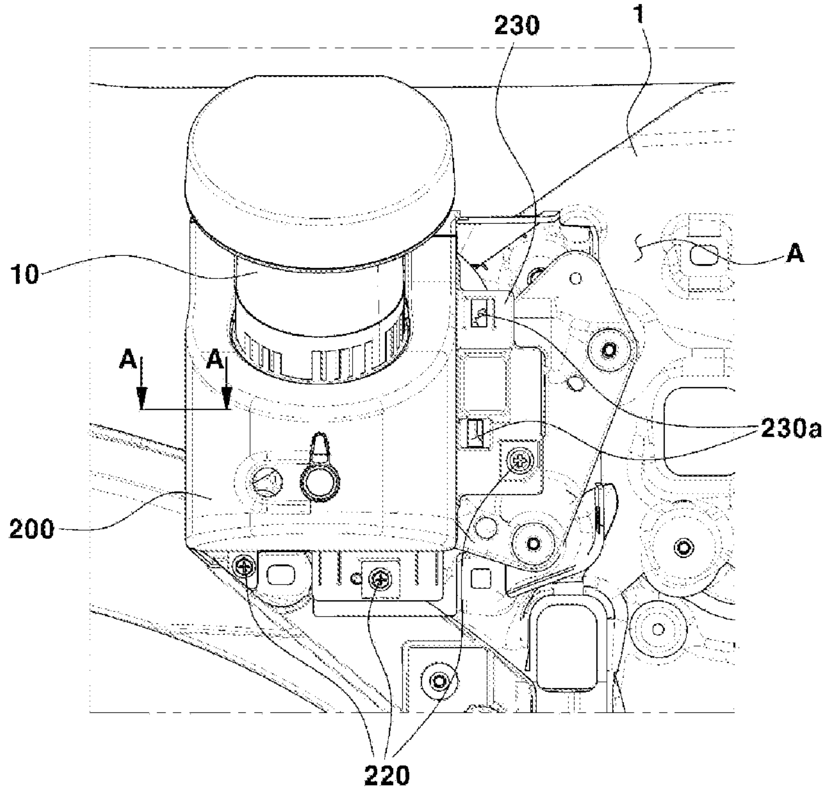
FIG. 5 is a view illustrating a mounted state of the second cover part of the fender cover for mounting of the autonomous driving sensor according to an embodiment of the present disclosure.
Figure 6:
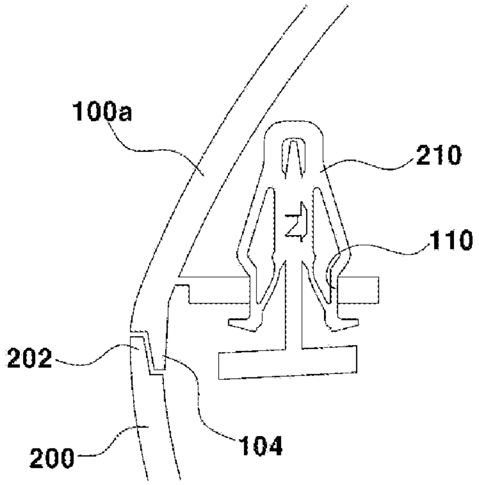
FIG. 6 is a cross-sectional view along line A-A in FIG. 5 illustrating coupling between the first cover part and the second cover part of the fender cover for mounting of the autonomous driving sensor according to an embodiment of the present disclosure.

In addition, FIG. 4 is a view illustrating mounting of a second cover part of the fender cover for mounting of the autonomous driving sensor according to an embodiment of the present disclosure, FIG. 5 is a view illustrating a mounted state of the second cover part of the fender cover for mounting of the autonomous driving sensor according to an embodiment of the present disclosure, and FIG. 6 is a cross-sectional view along line A-A in FIG. 5 illustrating coupling between the first cover part and the second cover part of the fender cover for mounting of the autonomous driving sensor according to an embodiment of the present disclosure.

Figure 7:
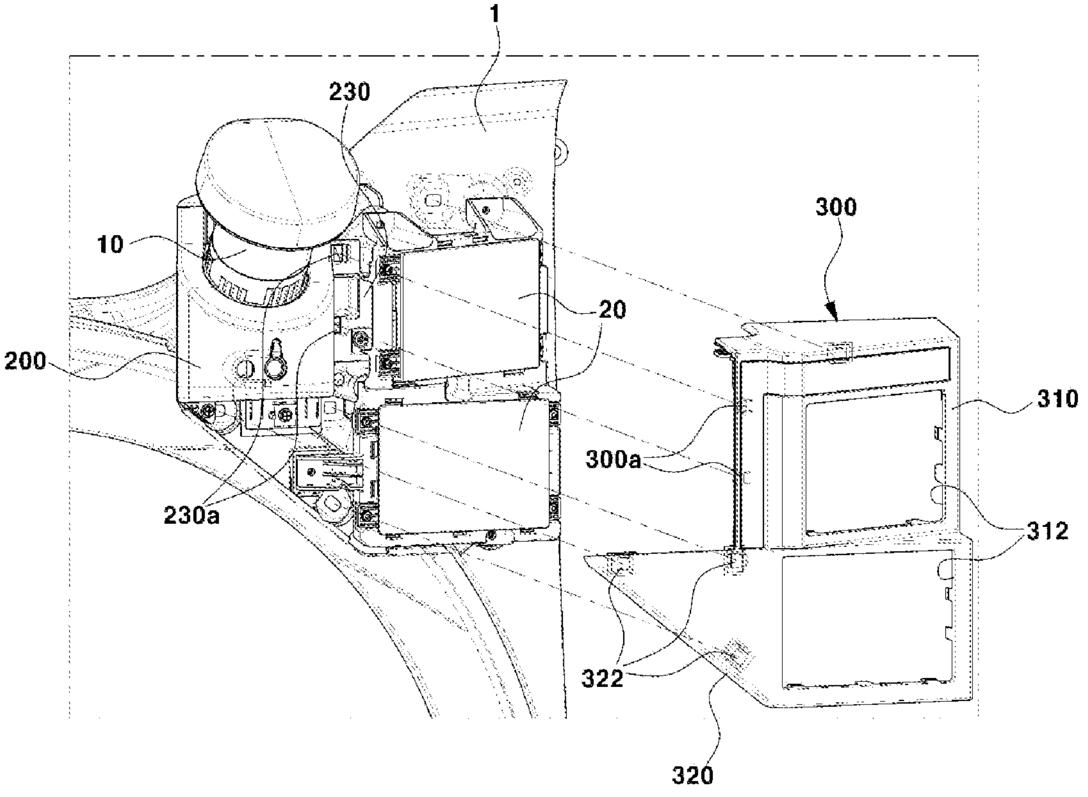
FIG. 7 is a view illustrating mounting of a third cover part of the fender cover for mounting of the autonomous driving sensor according to an embodiment of the present disclosure.
Figure 8:
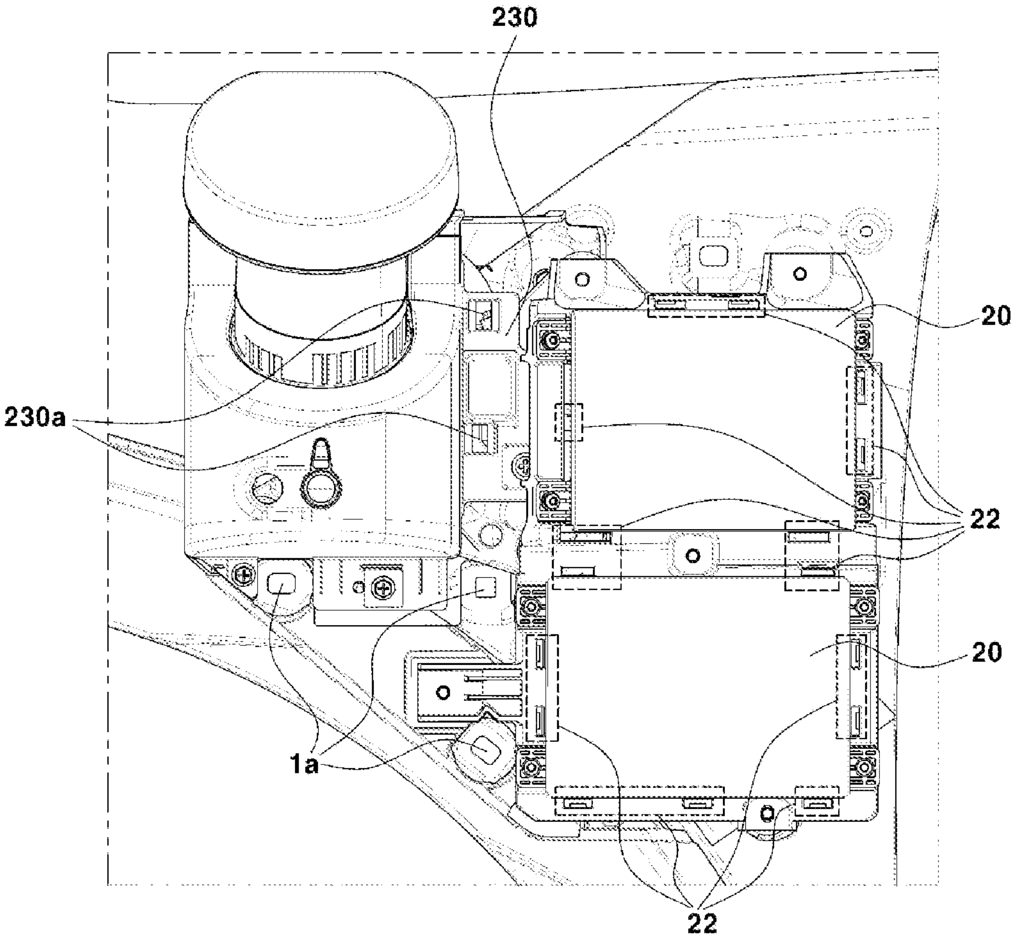
FIG. 8 is a view illustrating a mounted state of the third cover part of the fender cover for mounting of the autonomous driving sensor according to an embodiment of the present disclosure.
Figure 9:
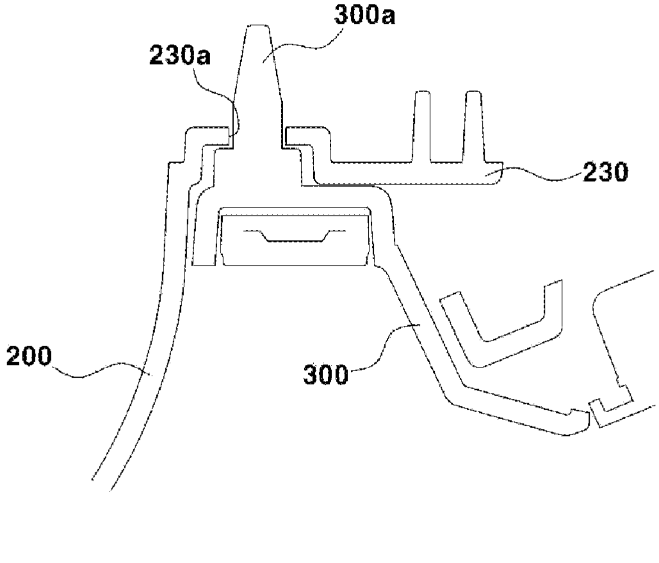
FIGS. 9 to 11 are views illustrating a fastened structure of the third cover part of the fender cover for mounting of the autonomous driving sensor according to an embodiment of the present disclosure.
Figure 10:
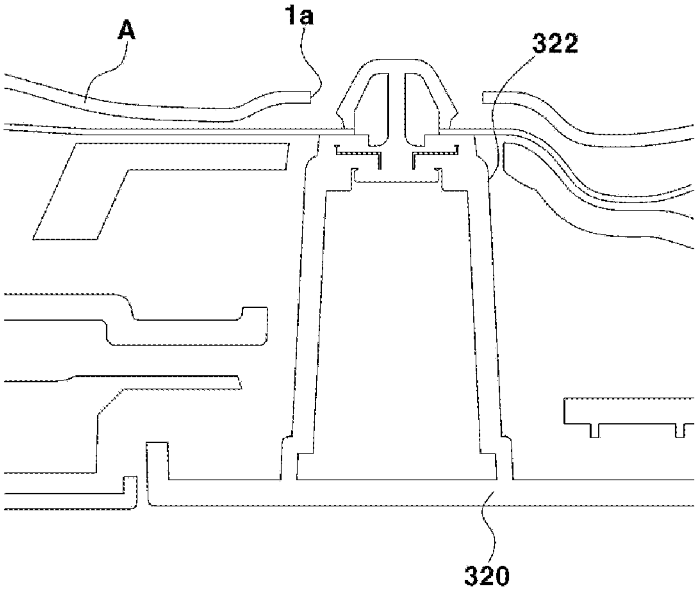
Figure 11:
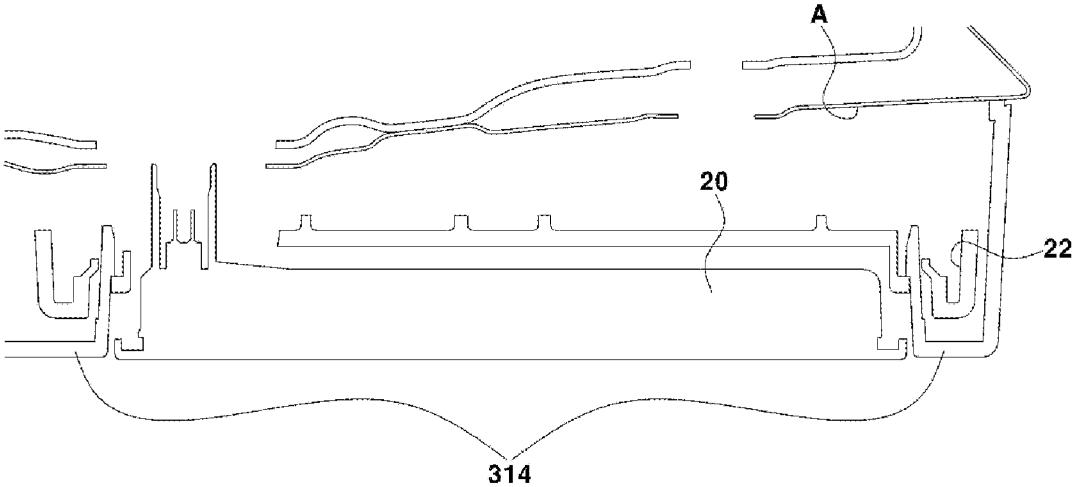

In addition, FIG. 7 is a view illustrating mounting of a third cover part of the fender cover for mounting of the autonomous driving sensor according to an embodiment of the present disclosure, FIG. 8 is a view illustrating a mounted state of the third cover part of the fender cover for mounting of the autonomous driving sensor according to an embodiment of the present disclosure, and FIGS. 9 to 11 are views illustrating a fastened structure of the third cover part of the fender cover for mounting of the autonomous driving sensor according to an embodiment of the present disclosure.

Figure 12:
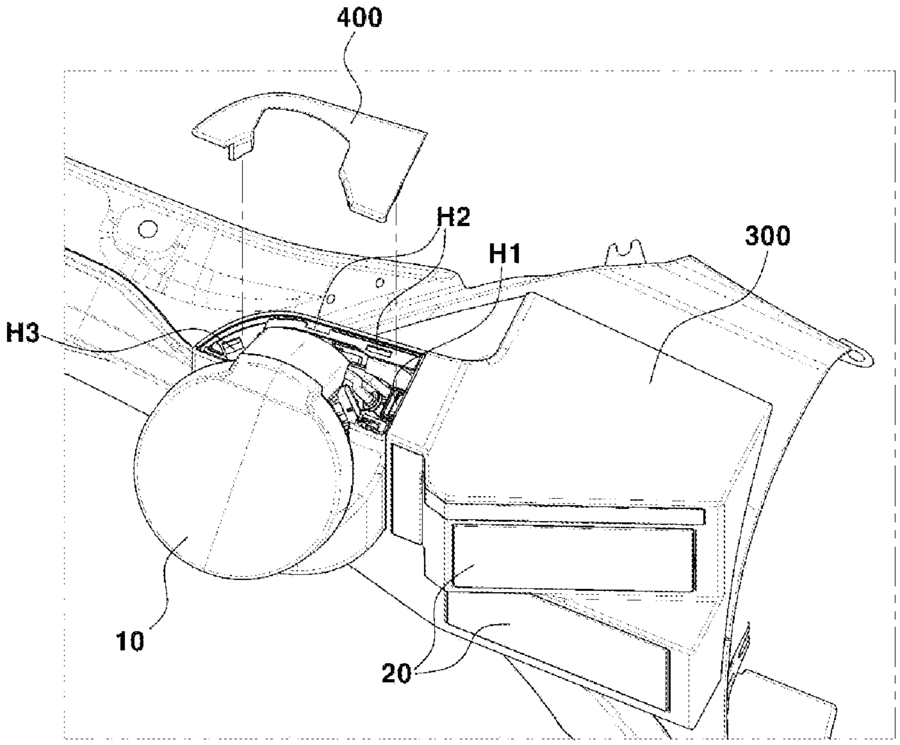
FIG. 12 is a view illustrating a fourth cover part of the fender cover for mounting of the autonomous driving sensor according to an embodiment of the present disclosure.
Figure 13:
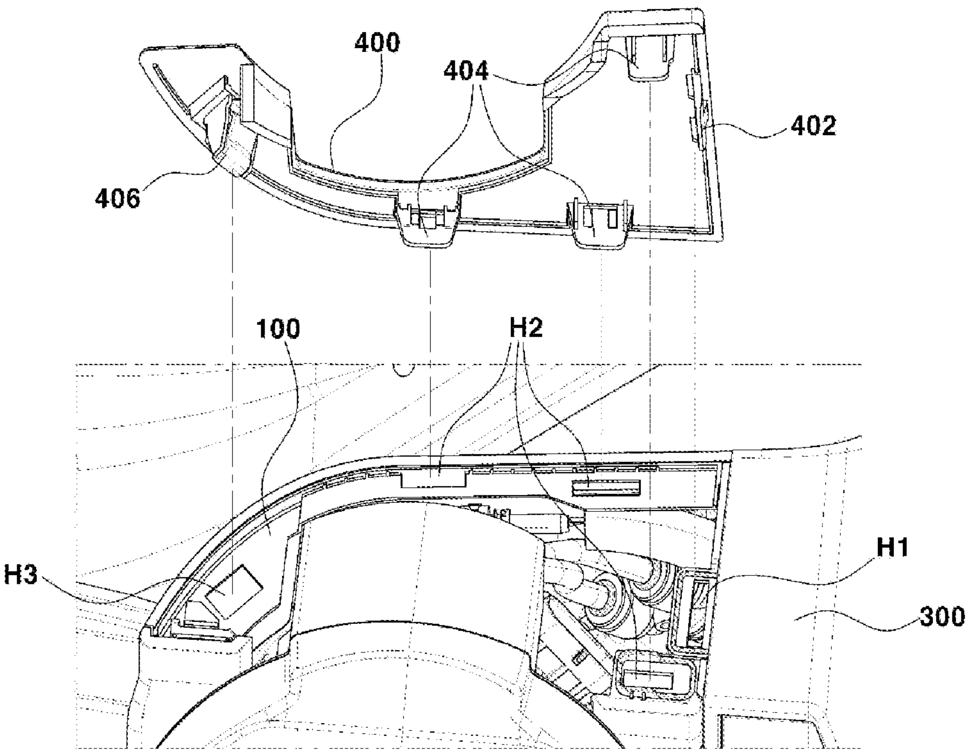
FIG. 13 is a view illustrating mounting of the fourth cover part of the fender cover for mounting of the autonomous driving sensor according to an embodiment of the present disclosure.
Figure 14:
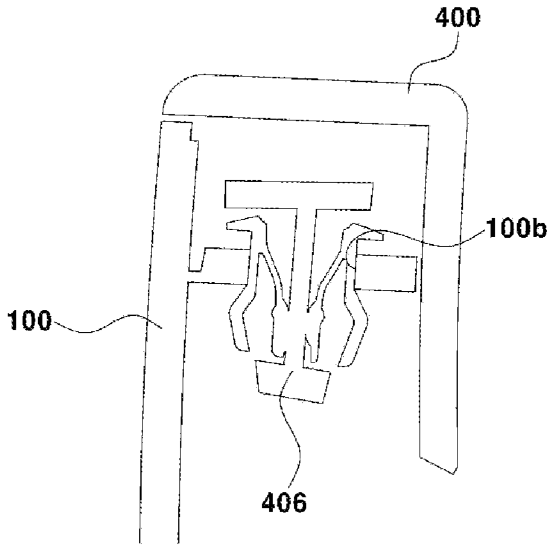
FIGS. 14 to 16 are views illustrating a fastened structure of the fourth cover part of the fender cover for mounting of the autonomous driving sensor according to an embodiment of the present disclosure.
Figure 15:
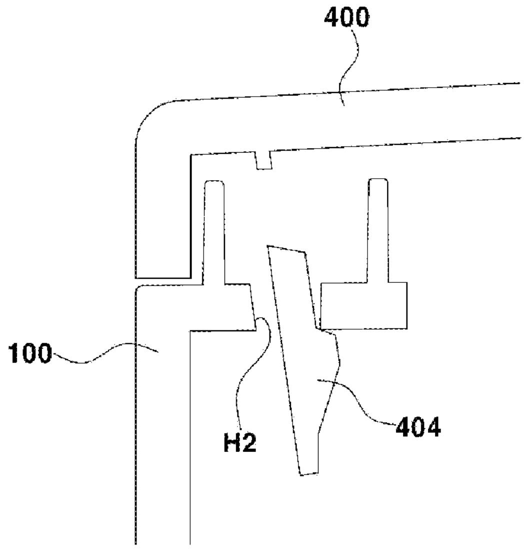
Figure 16:
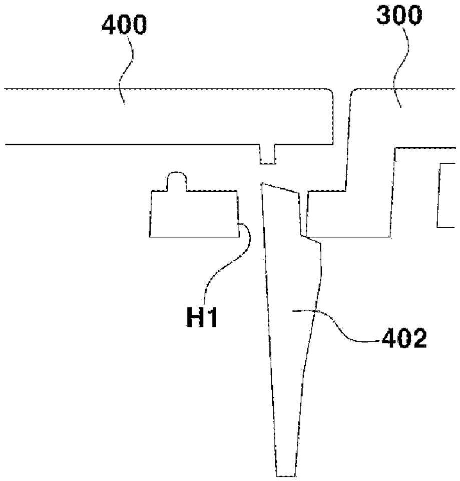

In addition, FIG. 12 is a view illustrating a fourth cover part of the fender cover for mounting of the autonomous driving sensor according to an embodiment of the present disclosure, FIG. 13 is a view illustrating mounting of the fourth cover part of the fender cover for mounting of the autonomous driving sensor according to an embodiment of the present disclosure, and FIGS. 14 to 16 are views illustrating a fastened structure of the fourth cover part of the fender cover for mounting of the autonomous driving sensor according to an embodiment of the present disclosure.

Since a fender 1 for a vehicle has a structure that is formed to protrude from a side surface of a body, when a first sensor 10, for example, a light detection and ranging (LiDAR) sensor is mounted on the structure of the fender 1, the LiDAR sensor inevitably protrudes excessively to the outside due to the structural characteristics of the LiDAR sensor with a predetermined height, and it may be difficult to secure an area in which a second sensor 20, for example, a radio detecting and ranging (radar) sensor required for autonomous driving together with the first sensor 10 is mounted due to a spatial restraint.

In addition, since the fender 1 has no separate mounting space due to the structural characteristics, has an entirely curved shape, and protrudes from a side surface of the vehicle, it may be difficult to fix and mount the LiDAR sensor and the radar sensor together.

To this end, although a separate exterior part made of plastic or the like may be newly applied, not only hole machining or the like for mounting of the exterior part is essential, but also a shape of the exterior of the fender 1 may be inevitably degraded in a process of the hole machining or the like.

Therefore, as illustrated in FIGS. 1 and 2, the fender cover for mounting of the autonomous driving sensor according to an embodiment may include a first cover part 100, a second cover part 200, and a third cover part 300, which have a divided structure for mounting the first sensor 10 and the second sensor 20.

First, the first cover part 100 is fastened to the fender 1 in which a mounting area A is machined and guides the first sensor 10 to be mounted in a protruded state in the mounting area A.

Here, as illustrated in FIGS. 2 and 3, it is preferable that the mounting area A in addition to a plurality of mounting holes 1*a* is formed by being pre-machined in the fender 1.

In addition, as illustrated in FIG. 3, the first cover part 100 includes a bracket 102 for mounting of the first sensor 10, specifically, the bracket 102 for mounting and connection of a plurality of sensing members including a power source for operating the first sensor 10.

Preferably, as illustrated in FIG. 2, the first cover part 100 may be formed to have a rounded first side 100*a* to surround the first sensor 10 having a circular outer circumferential surface shape.

The second cover part 200 is coupled to the first cover part 100, and as illustrated in FIG. 5, as a plurality of fastening members 220 pass through the first cover part 100 and are fastened to the mounting holes 1*a*, the second cover part 200 guides a mounting position of the first sensor 10 to be fixed to the first cover part 100.

Specifically, as illustrated in FIG. 4, the second cover part 200 includes a seating groove 200*a* with a shape corresponding to the shape of the first sensor 10, and in a state in which the first sensor 10 is exposed to the outside through the seating groove 200*a*, guides the mounting position of the first sensor 10 to be fixed to the first cover part 100.

Here, as illustrated in FIG. 6, the second cover part 200 includes a latching hook 202 at one side facing the first side 100*a* of the first cover part 100, and as the second cover part 200 is coupled to the first cover part 100, a latching hook 104 of the facing first cover part 100 is positioned by being caught on the latching hook 202 of the second cover part 200.

In other words, the second cover part 200 includes the latching hook 202, and the first cover part 100 includes the latching hook 104 with a shape corresponding to the latching hook 202 at one side thereof, and thus, it is possible to prevent a problem in which a step difference occurs as the first side 100*a* of the first cover part 100 is opened from the second cover part 200.

This intends to structurally prevent a problem in which when a position of the first sensor 10 mounted on the first cover part 100 needs to be adjusted, for example, when the position of the first sensor 10 needs to be adjusted to the first side 100*a* of the first cover part 100, the first sensor 10 presses the first side 100*a* of the first cover part 100 while a position of the first sensor 10 is adjusted, and at this time, the first side 100*a* of the first cover part 100 is opened while protruding to the outside of the second cover part 200 through structures of the latching hooks 104 and 202 with corresponding shapes, and thus it is also possible to prevent degradation of the shape of the exterior.

In addition, as illustrated in FIG. 6, the second cover part 200 includes a clip member 210 mounted therein to be inserted into a fastening hole 110 formed in the first cover part 100.

In other words, as illustrated in FIG. 3, the first cover part 100 includes a pair of fastening holes 110 disposed to be spaced apart from each other in a vertical direction, and the second cover part 200 may allow each of the clip members 210 to be inserted into one of the fastening holes 110 to be mounted on the first cover part 100.

Here, the clip member 210 may be formed in a wedge shape and may be formed in a structure that is positioned by being caught due to an expanded width as the clip member 210 is inserted into the fastening hole 110, and thus the second cover part 200 may be easily coupled to the first cover part 100.

As a result, in the embodiment, it is possible to provide an improved exterior having no step difference between the first cover part 100 and the second cover part 200 through the structures of the latching hooks 104 and 202 with the corresponding shapes and the clip member 210, and it is also possible to provide convenience according to coupling.

As illustrated in FIG. 5, the second cover part 200 includes a mounting member 230 formed to extend toward the second sensor 20 and includes mounting holes 230*a* formed so that the third cover part 300 is coupled by being disposed to overlap at the center.

The mounting hole 230*a* is for guiding the coupling of the third cover part 300, and thus the third cover part 300 may allow a coupling guide member 300*a* to be inserted into each of the pair of mounting holes 230*a* and coupled to the second cover part 200 (see FIG. 7), and when the coupling guide member 300*a* is inserted into the mounting hole 230*a*, the coupling guide member 300*a* is formed to be stepped and is in surface contact with the mounting member 230 (see FIG. 9), and thus it is possible to restrict moving positions in all directions.

Through the above coupling structure, the third cover part 300 supports the second cover part 200 for fixing the first sensor 10 and supports the second sensor 20 mounted in the mounting area A together using a mounting guide hole 312 with a shape corresponding to the shape of the second sensor 20.

To this end, as illustrated in FIG. 7, the third cover part 300 includes a first cover member 310 and a second cover member 320.

The first cover member 310 includes the pair of mounting guide holes 312 for supporting the second sensor 20 mounted to be spaced apart in the vertical direction in the mounting area A by a plurality of mounts 22 together and at the same time, allowing the second sensor 20 to be exposed to the outside.

The first cover member 310 includes hook members 314 and allows each of the hook members 314 to be positioned by being caught on one of the plurality of mounts 22, for example, ten mounts 22 (see a portion marked in a circular shape in FIG. 8) to fix the third cover part 300, and in this case, as illustrated in FIG. 11, since the hook member 314 is formed to extend without separate fastening and is provided to be in surface matching with the mounting area A, it is also possible to improve assemblability and exterior quality.

In addition, the second cover member 320 extends integrally from the first cover member 310 to support a lower portion of the second cover part 200 and is mounted in the mounting area A.

In other words, as illustrated in FIG. 10, the second cover member 320 includes a plurality of coupling protrusions 322 for fixing the third cover part 300, and each of the coupling protrusions 322 is inserted into one of the mounting holes 1*a* formed in the mounting area A to fix the third cover part 300.

As a result, the third cover part 300 has a first side and a second side fixed through the first cover member 310 and the second cover member 320 in a state in which the coupling guide member 300*a* is inserted into the mounting hole 230*a* to fix the center of the third cover part 300, and thus may effectively support the second sensor 20 together with the first sensor 10 fixed by the second cover part 200.

Meanwhile, as illustrated in FIG. 12, the fender cover for mounting of the autonomous driving sensor according to an embodiment may further include a fourth cover part 400.

In an embodiment, as the first sensor 10 is mounted on one side of the first cover part 100 with a predetermined inclination in order to secure a detection angle, the first cover part 100 is exposed in a state in which an inside is opened at the other side corresponding thereto, and the fourth cover part 400 is provided to block the inside of the first cover part 100 exposed to the outside by this structure.

Preferably, the fourth cover part 400 is formed in a shape corresponding to the corresponding portion in order to completely shield the portion exposed to the outside.

In addition, as illustrated in FIG. 13, the fourth cover part 400 may include hook members 402 and 404 inserted into hook fastening holes H1 and H2 formed along upper edges of the first cover part 100 and the third cover part 300, and movements in a longitudinal direction and a width direction may be restricted.

In other words, as the hook members 402 and 404 are provided as a plurality of hook members and are respectively inserted into the plurality of hook fastening holes H1 and H2 spaced at a 90° interval from each other, the hook members 402 and 404 may restrict the movements of the fourth cover part 400 in the longitudinal direction and the width direction.

When the hook member 402 is inserted into the hook fastening hole H1 of the third cover part 300 to restrict the movement in the longitudinal direction, as illustrated in FIG. 16, the hook member 402 is positioned by being caught outward, and when the hook member 404 is inserted into the hook fastening hole H2 of the first cover part 100 to restrict the movement in the width direction, as illustrated in FIG. 15, the hook member 404 is positioned by being caught inward, and thus the supporting is performed in opposite directions, and as a result, it is possible to provide a reliable restricting force in a direction in which the fourth cover part 400 is inserted.

As illustrated in FIGS. 13 and 14, the fourth cover part 400 further includes a clip member 406 inserted into a detachment hole H3 spaced apart from the hook fastening hole H2 and formed along the upper edge of the first cover part 100.

The clip member 406 is formed in the same structure as the clip member 210 of the second cover part 200 (see FIG. 6) and is provided to easily detach the fourth cover part 400.

More specifically, since the clip member 406 has a relatively weaker restricting force acting in an inserted direction, when a problem such as failure of the first sensor 10 occurs, one side of the fourth cover part 400 may be partially detached from the first cover part 100 by pulling the clip member 406 in a direction opposite to the inserted direction from the detachment hole H3.

In comparison, although the hook members 402 and 404 have strong restricting forces in a direction inserted into the hook fastening holes H1 and H2, when the fourth cover part 400 is pulled in an oblique direction in a state in which one side of the fourth cover part 400 is partially detached from the first cover part 100, the hook members 402 and 404 may be relatively easily separated from the hook fastening holes H1 and H2 due to a direction positioned by being caught, and thus the other side of the fourth cover part 400 may also be detached from the first cover part 100 and the third cover part 300.

Therefore, since the fourth cover part 400 may be easily detached from the first cover part 100 and the third cover part 300 for maintenance or the like of the first sensor 10, it is possible to provide a user with convenience.

According to embodiments of the present disclosure, it is possible to achieve the same sensor performance as before while improving the shape of the exterior of the body by dividing the plurality of covers and mounting the sensors by the covers in mounting the radar and LiDAR sensors for autonomous driving on the fender having no separate mounting space and the entirely protruded shape.

In addition, according to embodiments of the present disclosure, since the separate hole machining for mounting of the sensors is not required, it is possible to easily mount the sensors, and since the mounting is made by the assembly of the cover, even when the sizes of the sensors increase, the effective response and mounting are possible.

In addition, according to embodiments of the present disclosure, by performing the selective fastening or the surface matching with the nearby parts in order to improve the sense of heterogeneity with the nearby parts with respect to the divided covers, it is possible to improve assemblability and exterior quality.

Embodiments of the present disclosure have been described above with reference to the embodiments illustrated in the drawings, but it will be understood that this is only illustrative, and various modifications can be made from the present disclosure by those skilled in the art, and all or some of the above-described embodiments may also be configured in selective combination thereof. Therefore, the true technical scope of the present disclosure should be determined by the technical spirit of the appended claims.

What is claimed is:

1. A fender cover for mounting autonomous driving sensors, the fender cover comprising:

a first cover part fastenable to a fender for a vehicle in which a mounting area is machined, the first cover part configured to guide a first sensor to be mounted in a protruded state in the mounting area;

a second cover part coupled to the first cover part and configured to guide a mounting position of the first sensor; and a third cover part coupled to the second cover part via a stepped portion and fastened to the mounting area with a portion of the third cover part overlapping the second cover part, the third cover part disposed to support the second cover part and a second sensor mounted in the mounting area, wherein the third cover part includes a mounting guide hole with a shape corresponding to a shape of the second sensor.

2. The fender cover of claim 1, wherein the mounting area and a plurality of mounting holes are pre-machined in the fender.

3. The fender cover of claim 1, wherein the first cover part comprises a bracket for mounting of the first sensor and has a first side that is rounded to surround an outer circumferential surface of the first sensor.

4. The fender cover of claim 1, wherein the first sensor comprises a light detection and ranging (LiDAR) sensor.

5. The fender cover of claim 1, wherein the second cover part comprises a seating groove with a shape corresponding to a shape of the first sensor and is configured to guide the mounting position of the first sensor in a state in which the first sensor is exposed to the outside through the seating groove.

6. The fender cover of claim 5, wherein the second cover part comprises a latching hook at one side facing the first cover part and allows one side of the facing first cover part to be positioned by being caught on the latching hook as the second cover part is coupled to the first cover part.

7. The fender cover of claim 1, wherein the second cover part comprises a clip member mounted therein and configured to be inserted into a fastening hole disposed in the first cover part.

8. The fender cover of claim 7, wherein the clip member has a wedge shape and is configured to be positioned by being caught due to an expanded width as the clip member is inserted into the fastening hole.

9. The fender cover of claim 1, wherein the second cover part is disposed on a mounting member extending toward the second sensor, the mounting member comprising a mounting hole configured to receive the third cover part so that the third cover part is coupled to the mounting member and overlaps the mounting member.

10. The fender cover of claim 9, wherein the third cover part comprises coupling guide members insertable into a pair of mounting holes disposed to be spaced apart from each other in a vertical direction in the mounting member.

11. The fender cover of claim 1, wherein the third cover part comprises:

a first cover member including the mounting guide hole; and a second cover member extending integrally from the first cover member to support a lower portion of the second cover part and mounted in the mounting area.

12. The fender cover of claim 11, wherein:

the second cover member comprises a plurality of coupling protrusions inserted into mounting holes of the mounting area and allowing a first side of the third cover part to be fixed; and the first cover member comprises a hook member positioned by being caught on a mount for mounting of the second sensor and allowing a second side of the third cover part to be fixed.

13. The fender cover of claim 1, wherein the second sensor comprises a radio detecting and ranging (radar) sensor coupled at different mounting angles in a vertical direction.

14. A fender cover for mounting autonomous driving sensors, the fender cover comprising:

a first cover part fastenable to a fender for a vehicle in which a mounting area is machined and configured to guide a first sensor to be mounted in a protruded state in the mounting area;

a second cover part coupled to the first cover part and configured to guide a mounting position of the first sensor;

a third cover part coupled to the second cover part and fastened to the mounting area, disposed to support the second cover part and a second sensor mounted in the mounting area, and including a mounting guide hole with a shape corresponding to a shape of the second sensor; and a fourth cover part configured to shield an inside of the first cover part on which the first sensor is mounted from the outside by being fastened to the first cover part and to the third cover part, respectively, as the first sensor is mounted to be inclined on the first cover part.

15. The fender cover of claim 14, wherein the fourth cover part comprises hook members inserted into hook fastening holes disposed along an upper edge of the first cover part and an upper edge of the third cover part.

16. The fender cover of claim 15, wherein the fourth cover part further comprises a clip member insertable into a detachment hole spaced apart from the hook fastening holes and disposed along the upper edge of the first cover part.

17. The fender cover of claim 14, wherein the fourth cover part comprises a plurality of hook members insertable into a plurality of hook fastening holes disposed to be spaced at a 90° interval from each other to restrict movements of the fourth cover part in a longitudinal direction and a width direction.

18. A vehicle comprising:

a vehicle body comprising a fender in which a mounting area is machined;

a first autonomous driving sensor and a second autonomous driving sensor; and a fender cover, wherein the first autonomous driving sensor and the second autonomous driving sensor are mounted on the fender cover, and wherein the fender cover comprises:

a first cover part fastened to the fender and configured to guide the first autonomous driving sensor to be mounted in a protruded state in the mounting area;

a second cover part coupled to the first cover part and configured to guide a mounting position of the first autonomous driving sensor; and a third cover part coupled to the second cover part and fastened to the mounting area with a portion of the third cover part overlapping the second cover part, the third cover part disposed to support the second cover part and the second autonomous driving sensor mounted in the mounting area, and including a mounting guide hole with a shape corresponding to a shape of the second autonomous driving sensor.

19. The vehicle of claim 18, wherein the first cover part comprises a bracket for mounting of the first autonomous driving sensor and has a first side that is rounded to surround an outer circumferential surface of the first autonomous driving sensor.

20. The vehicle of claim 18, wherein the first autonomous driving sensor comprises a light detection and ranging (LiDAR) sensor, and wherein the second autonomous driving sensor comprises a radio detecting and ranging (radar) sensor coupled at different mounting angles in a vertical direction.

* * * * *